United States Patent [19]

Berner

[11] Patent Number: 4,589,476

[45] Date of Patent: May 20, 1986

[54] AIR VENTILATION AND FILTRATION APPARATUS

[76] Inventor: Erling Berner, Loretohohe 5, CH-6300 Zug, Switzerland

[21] Appl. No.: 734,940

[22] Filed: May 16, 1985

[51] Int. Cl.⁴ .............................................. F24H 3/02
[52] U.S. Cl. .................... 165/54; 55/385 R; 98/31.5; 98/31.6; 98/34.6; 165/4
[58] Field of Search ........... 165/54, 4; 98/31.5, 98/31.6, 33.1, 38.9, 42.02, 42.12, 34.6; 55/385; 62/410, 411, 412

[56] References Cited

U.S. PATENT DOCUMENTS

| | | | |
|---|---|---|---|
| 1,749,763 | 3/1930 | Fleisher | 98/34.6 X |
| 4,048,811 | 9/1977 | Ito et al. | 98/33.1 X |
| 4,049,404 | 9/1977 | Johnson | 165/54 X |
| 4,350,085 | 9/1982 | Lis | 98/34.6 |

Primary Examiner—Lloyd L. King
Attorney, Agent, or Firm—Robert D. Yeager

[57] ABSTRACT

Apparatus for exchanging air within an enclosure with outside air while subjecting air within the enclosure to gas filtration and/or electronic air cleaning. The apparatus includes a two-position valve to provide an intake cycle and an exhaust cycle; during both cycles the air treatment means is operative on air within the enclosure.

3 Claims, 11 Drawing Figures

AIR VENTILATION AND FILTRATION APPARATUS

BACKGROUND OF THE INVENTION

1. Field of the Invention

This invention relates to apparatus for exchanging room air with fresh outside air and for continually subjecting a portion of the room air to gas filtration during the exchange.

2. Description of the Prior Art

Apparatus for exchanging air within a room or other enclosure with fresh outside air are known. With the increased emphasis on constructing tightly-sealed buildings and homes for energy conservation purposes, there has developed a corresponding awareness for the need to exhaust stale (and possibly toxic) room air and replace it with fresh outside air. One of the problems associated with such an exchange is the introduction of cool drafts caused by the sudden influx of colder air from the outside. This problem essentially has been solved by the use of some form of heat exchange device which alternately stores heat given up by the exhausted air and heats the fresh air being supplied from the outside.

When conditions within the room or enclosure require (or make it desirable) that the air be cleaned beyond mere removal of airborne particles, however, workers in the art have resorted to the use of separate gas filtration devices. These devices, usually of the adsorptive type, typically remove odors, smoke and other noxious substances. As far as it is known, no attempt has been made to combine in an efficient, compact package an air exchange capability with an air cleaning capability.

SUMMARY OF THE INVENTION

The present invention combines in a single, relatively compact housing the necessary components to efficiently exchange stale room air with fresh outside air while, at the same time, to subject room air to gas filtration in order to clean it. The invention employs a minimum number of components in a simplified arrangement and thus permits the manufacture of such a ventilation/gas filtration unit at relatively low cost.

The present invention provides apparatus for exchanging air within an enclosure with outside air while continually subjecting air within said enclosure to gas filtration, comprising: a housing; ducting extending within the housing to provide a central chamber having four ports, each port being in communication with a port in the housing to establish four air flow channels; exhaust fan means mounted in a first of the channels to produce air flow from the enclosure; air supply fan means mounted in a second of the channels to produce air flow into the enclosure; gas filtration means located in a third of the channels, the third channel being ported to the enclosure; a heating storing matrix located in a fourth of the channels, the fourth channel being ported to outside air; and valve means disposed in the chamber and being positionable with respect to the four ports within the chamber to establish a first operating mode in which the first channel is in air flow communication with the fourth channel and the third channel is in air flow communication with the second channel, and a second operating mode in which the first channel is in air flow communication with the third channel and the fourth channel is in air flow communication with the second channel.

Preferably, the valve means employed in the present invention is a four way valve of vane construction; in this form, the vane moves between two positions to alternatively provide air flow communication between two adjacent ports on one side of the vane and two adjacent ports on the other side of the vane. In one position of the valve, the air flow channel containing the heat storing matrix functions as an exhaust channel with the exhausted air giving up heat to the matrix. When the valve is in its other position, the same air flow channel functions as a supply channel with the matrix giving up its stored heat to fresh outside air. As the valve reverses its position, air flow through the gas filtration means reverses, but at all times air within the enclosure is being cleaned thereby.

In certain circumstances, it may be desirable to include electronic air cleaning means in the present invention, either in combination with the gas filtration means or in substituion therefor. Accordingly, the present invention may alternatively comprise air treatment means located in the third channel, the air treatment means being selected from the group consisting of gas filtration means and electronic air cleaning means.

Other objects and advantages of the present invention will become apparent from the following detailed description taken with the accompanying drawings in which:

DETAILED DESCRIPTION OF THE PREFERRED EMBODIMENTS

Figure 1:
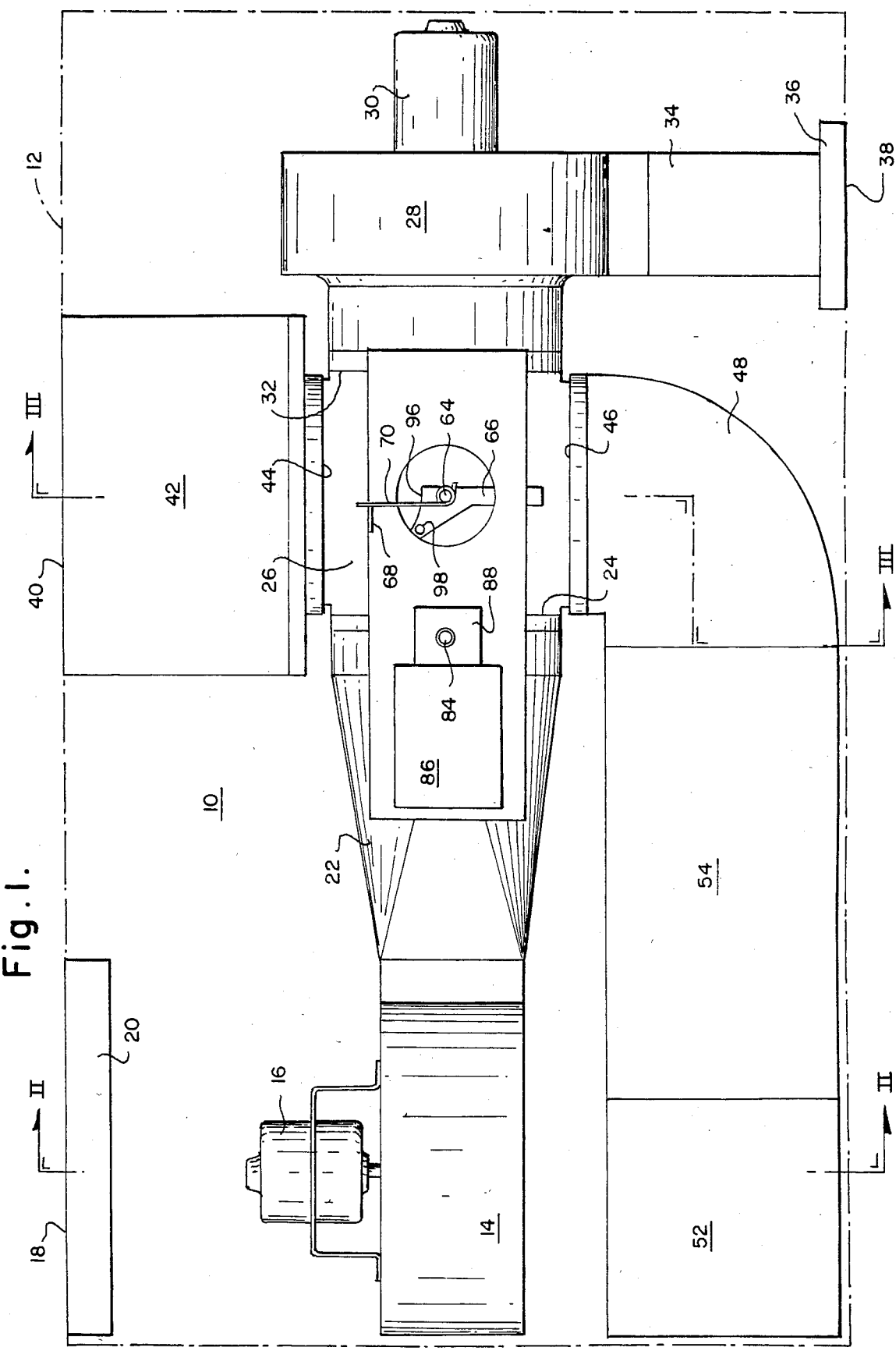
FIG. 1 is a side elevational view of the ventilator/gas filtration assembly of the present invention.
Figure 2:
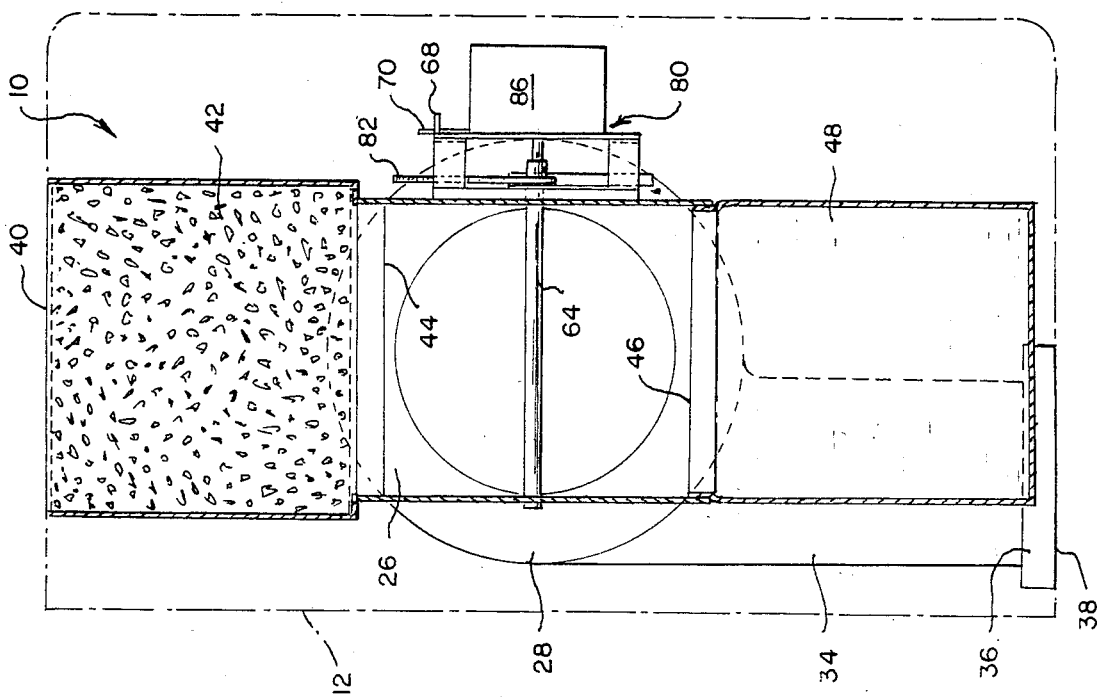
FIG. 2.is a transverse sectional view taken on line II—II of FIG. 1
Figure 3:
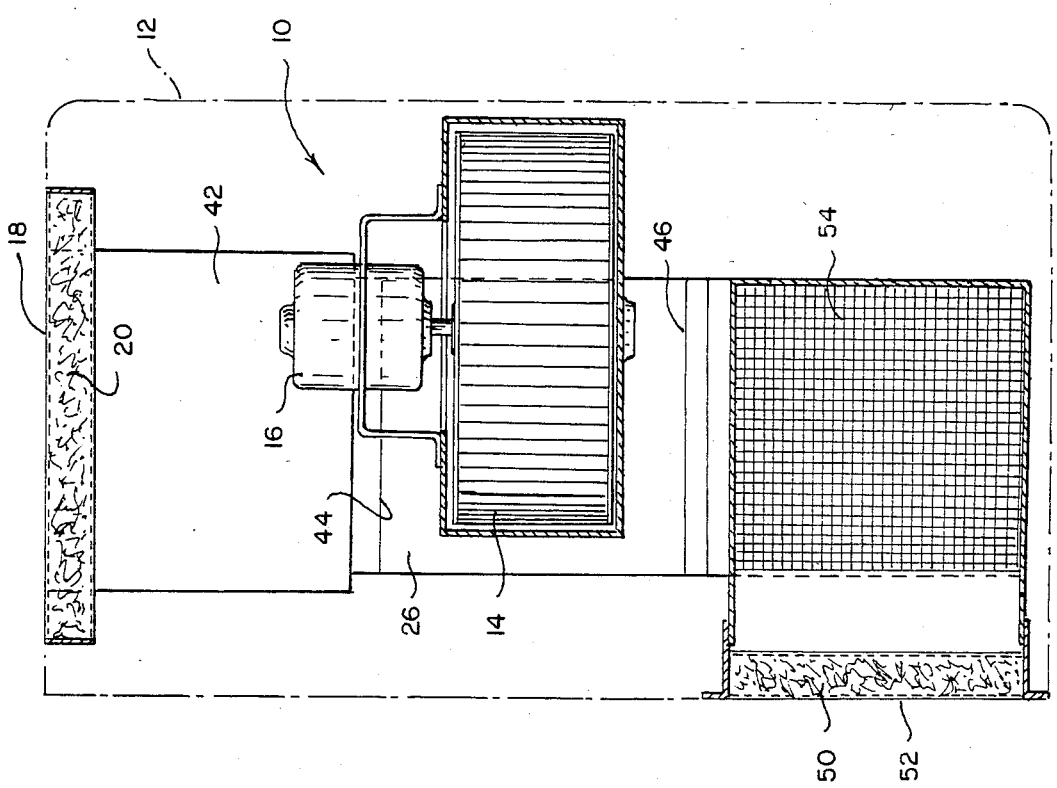
FIG. 3 is a transverse sectional view taken on line II—II of FIG. 1.
Figure 4:
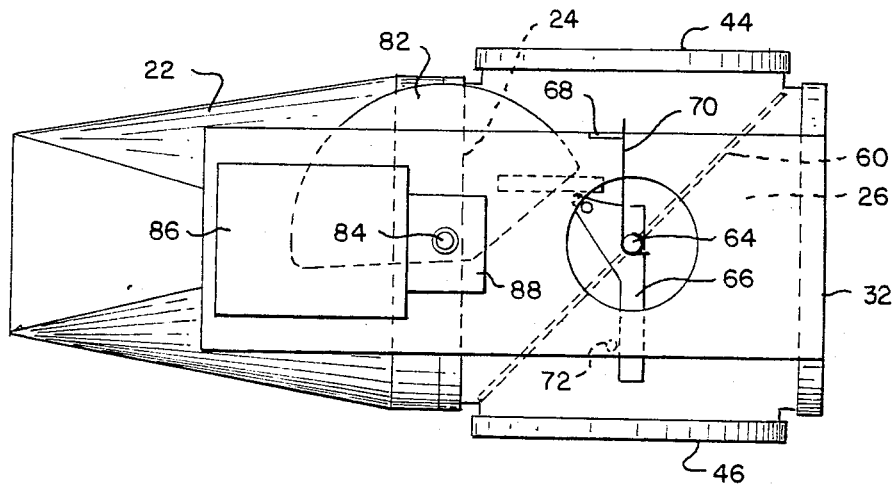
FIG. 4 is a detailed side elevational view of the four-way valve assembly within the present invention.
Figure 5:
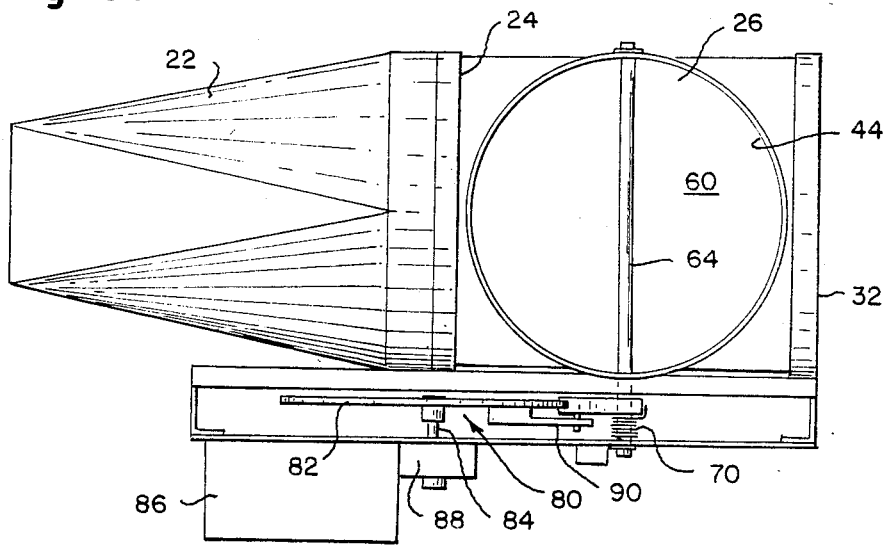
FIG. 5 is a top plan view of FIG. 4.
Figure 9:
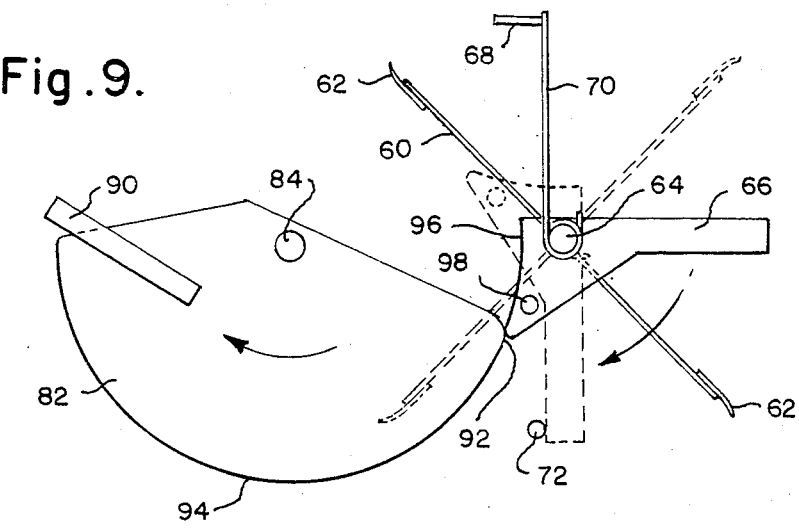
FIGS. 6, 7, 8, and 9 are sequential views of the drive means for the four-way valve.

Referring to the drawings, particularly to FIGS. 1-5, there is shown a ventilation/gas filtration unit 10 embodying the present invention. Ventilation/gas filtration unit 10 includes an outer housing or casing 12 (shown in chain-line in the drawings). Since the present invention involves providing defined flow passages or channels for air, there is provided within housing 12 ducting which establishes those flow passages; some of that ducting will be explained here with a description of the major components within housing 12; the remainder of the ducting will be explained in the description of the operation of the invention that follows.

An exhaust fan 14 driven by motor 16 is mounted within housing 12. Exhaust fan 14 is shown to be of the centrifugal type and is intended to draw air from a room or other enclosure through a port 18 located in the top of housing 12. The air drawn through port 18 passes through filter 20, which is intended to remove only relatively coarse airborne particles, and into the inlet side of exhaust fan 14. Exhaust fan 14 forces the air through a transition duct 22 and then through a port 24 into central valve chamber 26.

A supply fan 28 driven by motor 30 is mounted within housing 12. Supply fan 28 also is shown to be of the centrifugal type and is intended to draw air out of central valve chamber 26 through port 32 and into the inlet side of supply fan 28; the air is then forced through downwardly extending duct 34, through grill 36 and out of port 38 which also opens into the room or enclosure.

Disposed in the mouth of port 40 at the top of housing 12, which port also opens into the room or enclosure, is a gas filtration assembly 42 of the well-known adsorptive type. Exemplary of the type of material making up the filter bed within filter assembly 42 is activated alumina in spherical form and containing potassium permanganate; such a material is sold by the Carus Chemical Company division of Carus Corporation under the trademark CARUSORB 100. The filter material adsorbs impurities from air passing through it; in addition, oxidizable impurities are converted by the potassium permanganate present to carbon dioxide and water. Filter assembly thus permits removal of common impurities from air, such as cigarette smoke, cooking odors, and well as control of more toxic substances such as formaldehyde, ethylene, etc. It will be recognized that other types of filter material, such as activated carbon, may be used in the present invention depending upon existing conditions. Air access to filter assembly 42 from central valve chamber 26 is through port 44.

It may be desirable to combine gas filtration assembly 42 with an electronic air cleaning air device of any well-known type. Alternatively, such an electronic air cleaning device may be substituted for gas filtration assembly 42 when the chief concern is removal of particulate matter (e.g. pollen) from the air within an enclosure. Electronic air cleaners operate on the principle of electrostatic precipitation and may be of the ionizing-plate type, charged-media nonionizing type, or charged-media ionizing type. As a further alternative, it may be desirable, especially when the fresh air taken into ventilation/gas filtration unit 10 is laden with pollen or other particulates, to include an electronic air cleaner in duct 34; such an arrangement will remove particulates from the intake air before it enters the enclosure through port 38.

An air flow passage from central valve chamber 26 to the outside environment is established through port 46, downwardly through diverter duct 48, through filter 50 and out through port 52 located in the back side of housing 12 as viewed in FIG. 1. Filter 50, like filter 20, is intended to remove only coarse airborne particles such as dust. Disposed within this air flow passage to the outside is a heat storing matrix 54 of any well-known type used in ventilation apparatus. The purpose of heat storing matrix 54 is to recover and store heat from air being exhausted to the outside from the room or enclosure and then to give up that heat to fresh air flowing from the outside into the room or enclosure.

Figure 6:
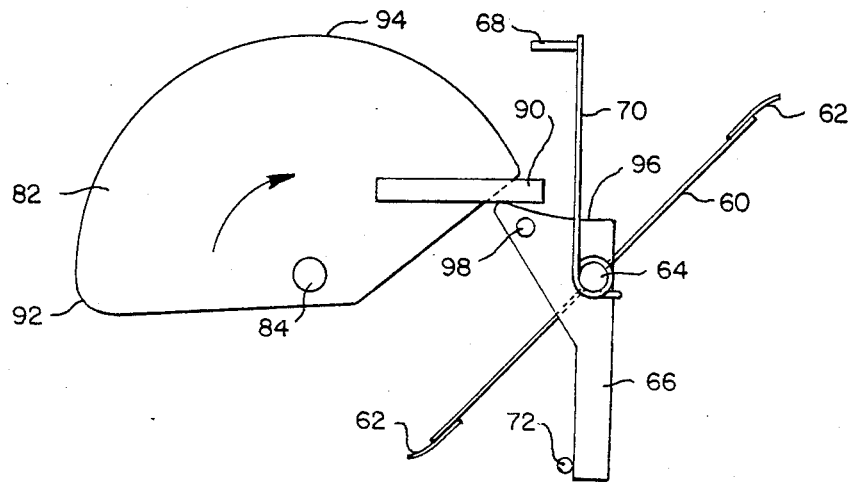
Figure 7:
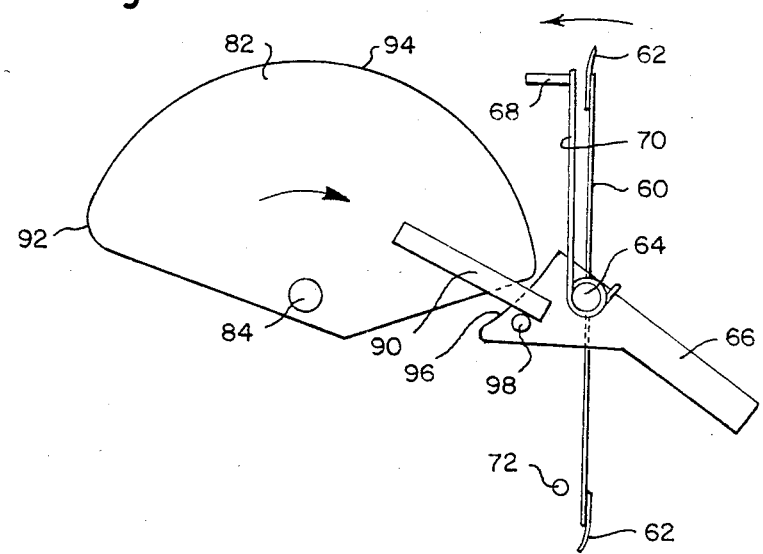
Figure 8:
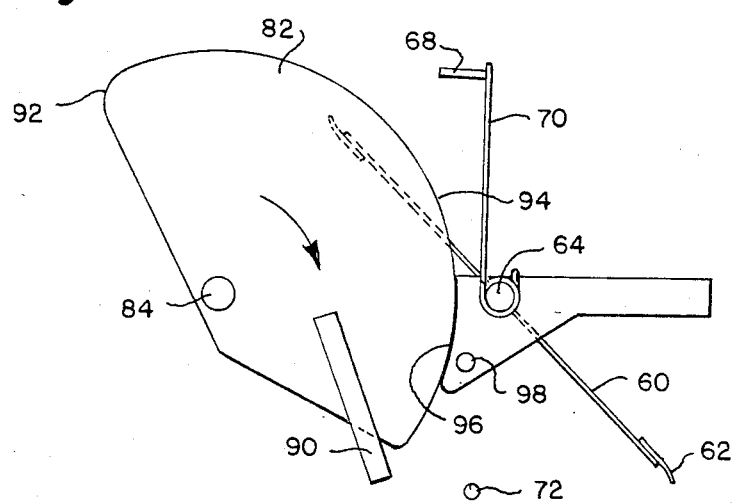

Referring now to central valve chamber 26, there is shown mounted within that chamber a two-position, vane-type, flapper valve 60. The purpose of flapper valve 60 is to move alternatively between two positions approximately at 2 second intervals to establish two separate air flow patterns within housing 12 at each position. The operation of flapper valve 60 will be described by primary reference to FIGS. 6-9. FIG. 6 shows flapper valve 60 at rest in what will be referred to as "Position 2". Flapper valve 60 includes flexible members 62 at each end which aid in forming seals across the ports formed in central valve chamber 26. Flapper valve 60 is rotatably mounted on shaft 64 which extends transversely across central valve chamber 26. Flapper valve 60 is rigidly mounted to a movable lever 66. Connnected between lever 66 and a stop plate 68, which is rigidly mounted within chamber 26, is a torsion spring 70. Spring 70 is wound around shaft 64 and hooked over an edge of lever 66; spring 70 biases lever 66 clockwise against stop pin 72. When lever 66 is rotated in a counterclockwise direction about shaft 64, the effect is to load torsion spring 70 and to urge lever 66 to move in a clockwise direction to its original position biased against stop pin 72.

The mechanism for moving flapper valve 60 includes a cam assembly generally designated by the reference numeral 80. Cam assembly 80 includes a cam plate 82 mounted on drive shaft 84 which is driven in a clockwise direction by motor 86 through gear reduction unit 88. Rigidly mounted to cam plate 82 is striker bar 90. Cam plate 82 includes a lobe area 92 and a curved cam surface 94 which is adapted to mate with curved surface 96 on lever 66. Striker bar 90 is intended to contact pin 98 on lever 66 and cause it to rotate in a counterclockwise direction.

With flapper valve in Position 2 (as shown in FIG. 6), cam plate 82 rotates clockwise and striker bar 90 contacts pin 98. As cam plate 82 continues to move, lever 66 begins to move counterclockwise and moves flapper valve 60 off its sealed position in Position 2 (see FIG. 7). Flapper valve 60 rotates counterclockwise to its alternate seated position, Position 1 (see FIG. 8), and remains there as long as cam surface 94 is in contact with mating surface 96 of lever 66. During this period, the rotation of lever 66 loads torsion spring 70. As lobe 92 breaks contact with mating surface 96 (see FIG. 9), lever 66 is now free to move and torsion spring 70 snaps it in a clockwise direction against stop pin 72. Flapper valve 60 thus is returned to its Position 2 and remains there until the cycle of cam assembly 80 is repeated. By this cyclic operation, flapper valve 60 remains in each of its positions for about 2 seconds.

Figure 10:
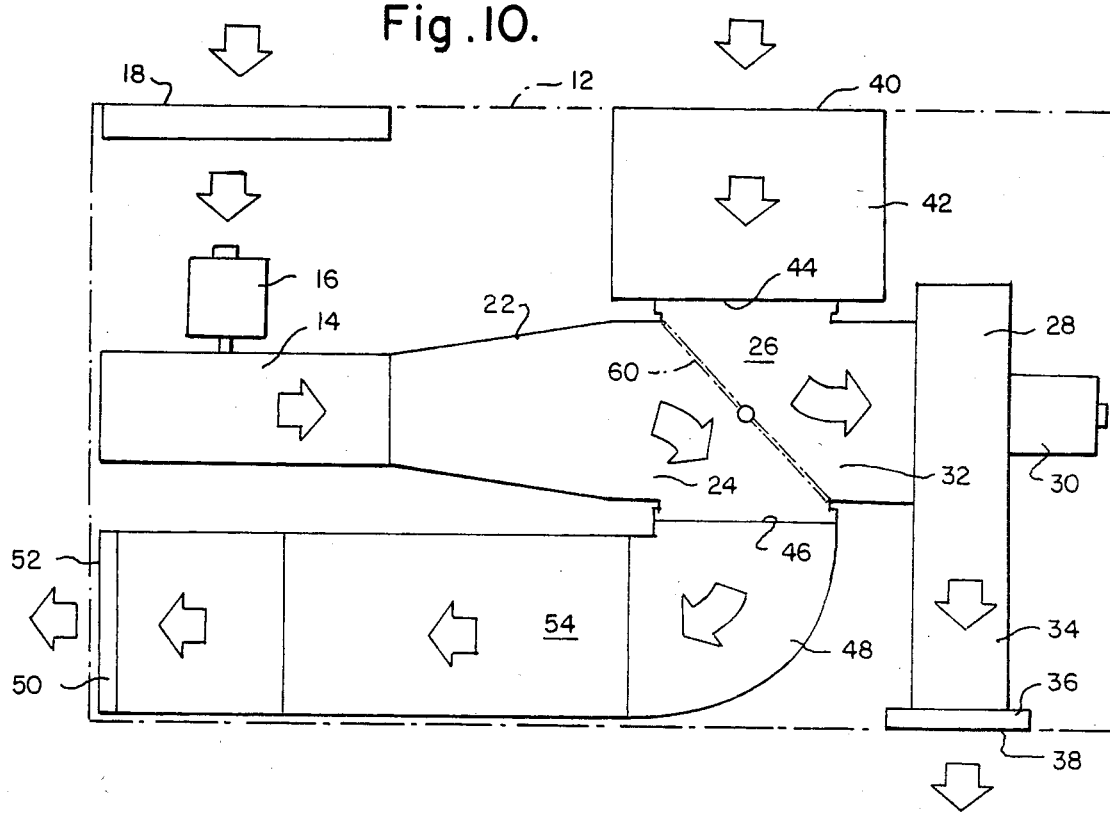
FIG. 10 is a diagrammatic view of the present invention showing air flow patterns when the four-way valve is in one position.
Figure 11:
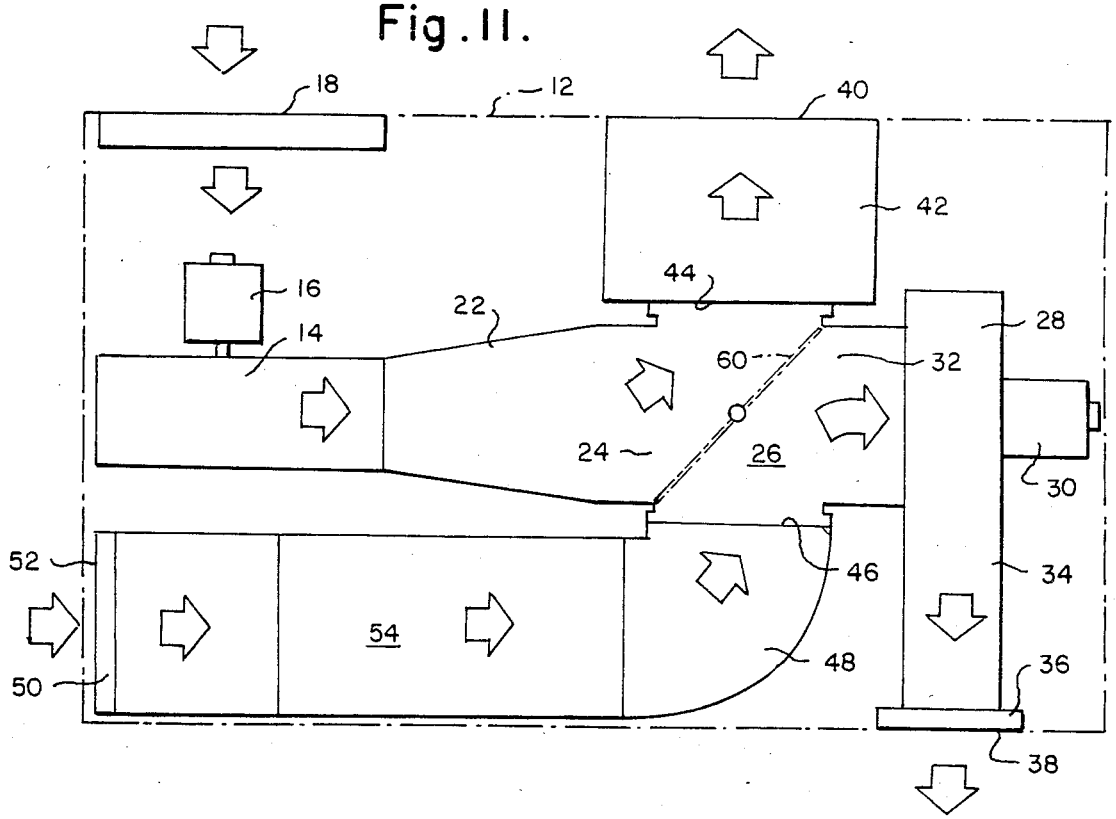
FIG. 11 is a diagrammatic view of the present invention showing air flow patterns when the four-way valve is in its other position.

Reference now will be made to FIGS. 10 and 11. As alluded to above, housing 12 contains appropriate ducting for establishing the air flow channels used in the present invention. That ducting, although shown diagrammatically, will be readily apparent to those skilled in the art and its construction details are well within that skill.

FIG. 10 shows the air flow patterns employed when flapper valve 60 is in Position 1. Air from the room is drawn into housing 12 through port 18; the air passes through exhaust fan 14, transition section 22, and thorough port 24 into central valve chamber 26. The presence of flapper valve 60 in Position 1 causes the air to flow downwardly through port 46 and diverter duct 48; the air then passes through heat storing matrix 54. When the relatively warm air contacts the relatively cool surfaces of heat storing matrix 54, a heat exchange process occurs and the air gives up its heat to the matrix. After leaving heat storing matrix 54, the air flows through filter 50 and out of port 52 to the outside atmosphere. The air flow pattern just described has the effect of withdrawing stale air from the room and exhausting it to the outside.

With flapper valve 60 in Position 1, a second air flow pattern is established by the action of supply fan 28. Fan 28 draws air from the room through port 40 and into filter assembly 42. The air is cleaned in the manner described above by filter assembly 42 and flows through port 44 into central valve chamber 26. The presence of flapper valve 60 in its Position 1 causes the air to flow through port 32 and into supply fan 28; the clean air is then returned to the room through duct 34 and port 38. It thus may be seen that while some stale room air is being exhausted to the outside, other room air is being cleaned by the gas filtration action of the present invention.

Referring now to FIG. 11, flapper valve 60 has been cycled to its Position 2. In that condition, stale room air is drawn into housing 12 through port 18 by exhaust fan 14 in the manner described above. When this air reaches central valve chamber 26 through port 24, however, the presence of flapper valve 60 in its Position 2 causes the air to flow through port 44 and into filtration assembly 42. There the air is cleaned in the manner described above and is returned to the room through port 40 in the top of housing 12.

With flapper valve 60 in Position 2, a second air flow pattern is established by the action of supply fan 28. Fresh outside air is drawn by fan 28 through port 52 and filter 50 and then passes through heat storing matrix 54. The relatively cool outside air receives heat from the heat exchange process within matrix 54 and passes upwardly through diverter duct 48 and into central chamber 26 via port 46. The presence of flapper valve 60 in its Position 2 causes the fresh, heated air to enter supply fan 28 via port 32 and is forced into the room through duct 34 and port 38. It thus may be seen that while fresh outside air is being supplied to the room, other room air is being cleaned by the gas filtration action of the present invention.

In a typical installation in which exhaust and supply fans 14, 28 each have a capactiy of 80 CFM, the present invention will clean about 5.333 ft$^3$ of air in one 4 second cycle. In the same cycle, the present invention will supply 2.667 ft$^3$ of fresh air to the room and will exhaust a like volume of stale air to the atmosphere. What is claimed is:

1. Apparatus for exchanging air within an enclosure with outside air while subjecting air within said enclosure to gas filtration comprising:
   a housing;
   ducting extending within said housing to provide a central chamber having four ports, each port being in communication with a port in said housing to establish four air flow channels;
   exhaust fan means mounted in a first of said channels to produce air flow from said enclosure;
   air supply fan means mounted in a second of said channels to produce air flow into said enclosure;
   gas filtration means located in a third of said channels, said third channel being ported to said enclosure;
   a heat storage matrix located in a fourth of said channels, said fourth channel being ported to outside air; and
   valve means disposed in said central chamber and being positionable with respect to said four ports within said chamber to establish a first operating mode in which said first channel is in air flow communication with said fourth channel and said third channel is in air flow communication with said second channel, and a second operating mode in which said first channel is in air flow communication with said third channel and said fourth channel is in air flow communication with said second channel.

2. Apparatus as recited in claim 1 which further comprises:
   electronic air cleaning means disposed in said second channel.

3. Apparatus for exchanging air within an enclosure with outside air while subjecting air within said enclosure to gas filtration comprising'
   a housing;
   ducting extending within said housing to provide a central chamber having four ports, each port being in communication with a port in said housing to establish four air flow channels;
   exhaust fan means mounted in a first of said channels to produce air flow from said enclosure;
   air supply fan means mounted in a second of said channels to produce air flow into said enclosure;
   air treatment means located in a third of said channels, said third channel being ported to said enclosure and said air treatment means being selected from the group consisting of gas filtration means and electronic air cleaning means;
   a heating storage matrix located in a fourth of said channels, said fourth channel being ported to outside air; and
   valve means disposed in said central chamber and being positionable with respect to said four ports within said chamber to establish a first operating mode in which said first channel is in air flow communication with said fourth channel and said third channel is in air flow communication with said second channel, and a second operating mode in which said first channel is in air flow communication with said third channel and said fourth channel is in air flow communication with said second channel.

* * * * *

UNITED STATES PATENT AND TRADEMARK OFFICE
CERTIFICATE OF CORRECTION

PATENT NO. : 4,589,476
DATED : May 20, 1986
INVENTOR(S) : Erling Berner

It is certified that error appears in the above—identified patent and that said Letters Patent is hereby corrected as shown below:

Col. 2, line 37, delete "II-II" and substitute therefor --III-III--; and

Col. 3, line 35, delete "air" second occurrence.

Signed and Sealed this

Twenty-sixth Day of August 1986

[SEAL]

Attest:

Attesting Officer

DONALD J. QUIGG

Commissioner of Patents and Trademarks